United States Patent
Gjokaj et al.

(10) Patent No.: US 9,307,138 B2
(45) Date of Patent: *Apr. 5, 2016

(54) FOCUSING SYSTEM FOR MOTION PICTURE CAMERA

(71) Applicant: Convexity Media, Inc., Brooklyn, NY (US)

(72) Inventors: Enver Gjokaj, Los Angeles, CA (US); Daniel Raymond Long, Brooklyn, NY (US); Theodore R. Ullrich, Brooklyn, NY (US); Pepin S. Gelardi, Brooklyn, NY (US)

(73) Assignee: Convexity Media, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,379

(22) Filed: Apr. 22, 2014

(65) Prior Publication Data
US 2015/0304541 A1 Oct. 22, 2015

(51) Int. Cl.
*H04N 5/232* (2006.01)
*H04N 5/222* (2006.01)

(52) U.S. Cl.
CPC ......... *H04N 5/23212* (2013.01); *H04N 5/2228* (2013.01); *H04N 5/23293* (2013.01); *H04N 5/23296* (2013.01)

(58) Field of Classification Search
CPC .......... H04N 5/23212; H04N 5/23293; H04N 5/247; H04N 13/0239; H04N 13/0055; H04N 5/23248; H04N 5/23296; H04N 5/2228; G03B 3/12; G03B 13/34
See application file for complete search history.

(56) References Cited

U.S. PATENT DOCUMENTS

| | | | |
|---|---|---|---|
| 4,002,899 A | 1/1977 | Stauffer | |
| 4,093,365 A | 6/1978 | Isono | |
| 4,240,727 A | 12/1980 | Lermann et al. | |
| 4,265,528 A | 5/1981 | Bestenreiner et al. | |
| 4,601,557 A * | 7/1986 | Bogle et al. | 352/140 |
| 5,076,686 A | 12/1991 | Preston | |
| 5,092,670 A | 3/1992 | Preston | |
| 5,142,642 A | 8/1992 | Sudo | |
| 5,832,107 A * | 11/1998 | Choate | G01B 11/245 348/E13.014 |
| 6,160,607 A | 12/2000 | Diaconu | |
| 6,549,650 B1 * | 4/2003 | Ishikawa et al. | 382/154 |
| 6,919,927 B1 * | 7/2005 | Hyodo | H04N 1/00411 348/333.02 |
| 8,121,471 B1 * | 2/2012 | Gjokaj | G03B 3/12 348/141 |
| 2002/0057256 A1 * | 5/2002 | Flack | G06F 1/1626 345/157 |
| 2006/0072019 A1 * | 4/2006 | Stavely | H04N 5/2254 348/208.99 |
| 2007/0177046 A1 * | 8/2007 | Makii | H04N 5/2254 348/335 |
| 2010/0201812 A1 | 8/2010 | McGibney et al. | |
| 2011/0122257 A1 | 5/2011 | Kirk | |
| 2012/0069149 A1 * | 3/2012 | Masuda | 348/46 |
| 2012/0154442 A1 * | 6/2012 | Takaoka | H04N 5/23216 345/634 |
| 2013/0010106 A1 * | 1/2013 | Yokota | 348/135 |
| 2014/0028825 A1 * | 1/2014 | Yamagata et al. | 348/77 |

* cited by examiner

*Primary Examiner* — Luong T Nguyen
(74) *Attorney, Agent, or Firm* — Blakely Sokoloff Taylor & Zafman LLP

(57) ABSTRACT

A method of determining a focal distance between a principal camera and a target object utilizes first and second video cameras mounted in spaced apart positions relative to a principal camera. A first video image from the first video camera is displayed on a video monitor and a second video image from the second video signal is superimposed onto the first image. First and second controllers are provided for positioning the first and second video images, respectively, on the video monitor. First and second position signals corresponding to positioning of the first and second video images, respectively, are acquired. When the images of a target object in the two video images are aligned, the position signals are used to compute the focal distance from the principal camera to the object.

9 Claims, 9 Drawing Sheets

Left camera view  Right camera view

FOCUSING SYSTEM FOR MOTION PICTURE CAMERA

RELATED PATENT

This application is related to U.S. Pat. No. 8,121,471 issued on Feb. 21, 2012, the disclosure of which is incorporated by reference as if fully set forth herein.

FIELD OF THE INVENTION

This invention relates generally to the field of photography and, more particularly, to methods and apparatus for automating the focus control of a film or video camera.

BACKGROUND

Maintaining a properly focused image is critically important in film and television productions. This task is complicated by the fact that many shots require a moving object to be kept in focus or require different objects at different distances from the camera to be in focus at different times during the shot. Before a shot, the person responsible for focusing the camera typically prepares for the shot by carefully measuring the distance to each object that is to be in focus during the shot. These distances are then recorded for use during the shot, such as by marking the focusing ring on the camera lens with the measured distances. During the shot, a "focus puller" adjusts the focusing ring to bring each object into precise focus at the desired time. This method obviously relies on the skill of the focus puller. It is difficult enough to maintain proper focus with stationary objects. If the camera or the subjects to be photographed are moving, it becomes even more difficult to maintain the proper focus. Furthermore, this method is time consuming since careful measurements must be taken and recorded before each shot. While this is being done, the cast and the rest of the production crew must often remain idle.

U.S. Pat. No. 8,121,471 discloses a method and apparatus for automating the camera focusing process. In a particular embodiment described therein, left and right video cameras flank the principal photographic camera. The video cameras are coupled to respective video monitors, each of which has a vertical cursor line superimposed in the middle of the screen representing 90°. A cursor controller allows this line to be moved left and right. As the line is moved left or right to track a desired point of focus on the camera subject, the value increases or decreases from 90°. Software interprets the cursor displacement and determines a real world angular value based on calibration of the focusing system. The angular values are then used to compute the focal distance between the principal camera and the subject.

While the method and apparatus of U.S. Pat. No. 8,121,471 are significant improvements over the prior art, further improvements have been developed.

SUMMARY

The present invention provides an improved method of determining a focal distance between a principal camera and a target object. In one embodiment, first and second video cameras are mounted in spaced apart positions relative to a principal camera. A first video image from the first video camera is displayed on a video monitor and a second video image from the second video signal is superimposed onto the first image. First and second controllers are provided for positioning the first and second video images, respectively, on the video monitor. First and second position signals corresponding to positioning of the first and second video images, respectively, are acquired. When the images of a target object in the two video images are aligned, the position signals are used to compute the focal distance from the principal camera to the object.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

DETAILED DESCRIPTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

U.S. Pat. No. 8,121,471 describes a camera focusing system with left and right video cameras flanking the principal photographic camera. The video cameras are coupled to respective video monitors, each of which has a vertical cursor line superimposed in the middle of the screen representing 90°. A cursor controller allows this line to be moved left and right. As the line is moved left or right to track an object that is the desired focal point, the value increases or decreases from 90°. Software interprets the cursor displacement and determines a real world angular value based on calibration of the focusing system. The angular values are then used to compute the focal distance between the principal camera and the focal point object.

Figure 1:
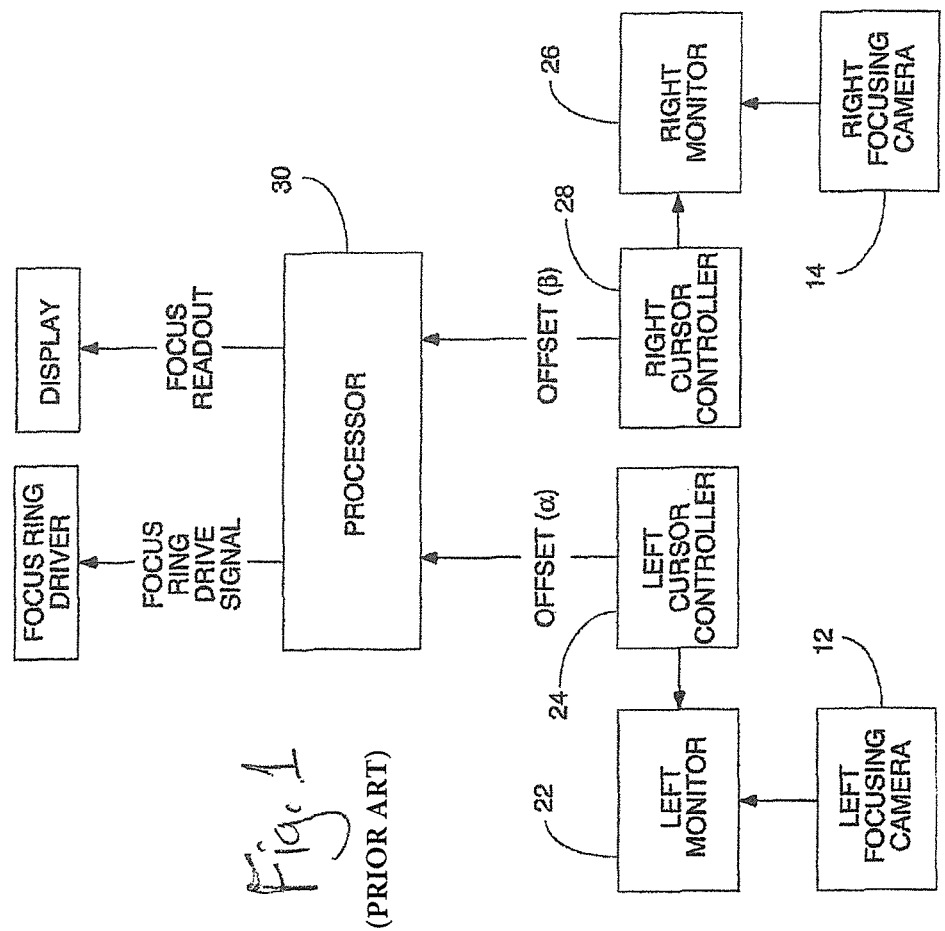
FIG. 1 is a functional block diagram of the camera focusing system described in U.S. Pat. No. 8,121,471.

Referring to FIG. 1, the video signal from left focusing camera 12 is fed to a left monitor 22 and the video signal from right focusing camera 14 is fed to a right monitor 26. In an alternative embodiment, a single video monitor may be used to display the video signals from both cameras. Left cursor controller 24 superimposes a cursor on left monitor 22, which can be moved left and right under operator control. Similarly, right cursor controller 28 superimposes a cursor on right monitor 26, which can also be moved left and right under operator control. The cursor displacements from center, representing the angular displacements of the focal point object, are sent to processor 30, which then calculates the focal distance by triangulation. The processor provides a focus ring drive output signal to turn the focus ring of principal camera 10 with a servo-controlled stepper motor or similar mechanism. Although cursor controllers 24 and 28 are illustrated as functional blocks external to processor 30, it will be understood that the cursor control functions may, if desired, be implemented with software executed by processor 30.

Touchscreen Focus Tablets

As explained above, the system described in U.S. Pat. No. 8,121,471 employs one or two video monitors for displaying the images of a pair of focusing cameras. A cursor is superimposed on the video signal from each of the focusing cameras. The cursor is moved by operator control, such as a simple scroll wheel or toggle stick, to lie over the desired point of focus on the video image of the subject.

Figure 2:
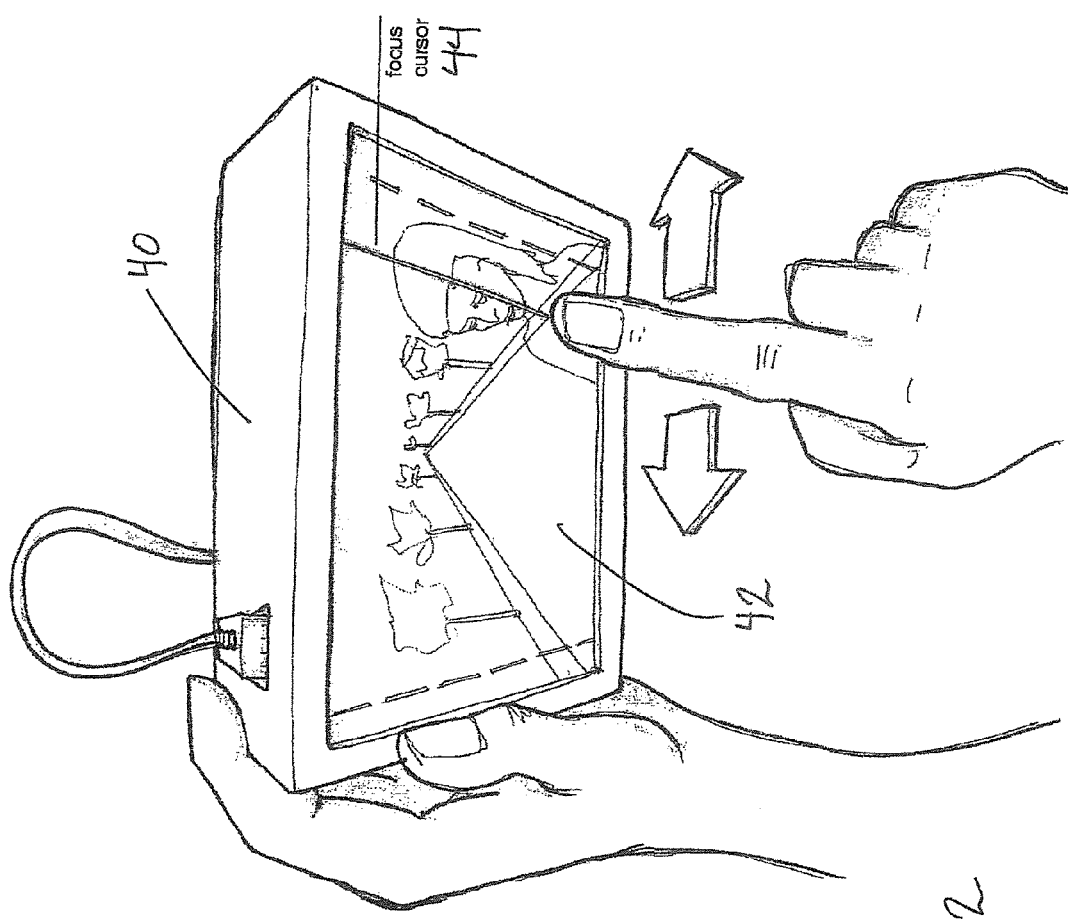
FIG. 2 illustrates the use of a tablet with a touch-sensitive screen as a monitor in the system of FIG. 1.

FIG. 2 illustrates an improvement to the system of U.S. Pat. No. 8,121,471, wherein the video signal from the focusing camera(s) is displayed on a tablet 40 with a touch-sensitive screen 42. The operator is able to touch and drag a focus cursor 44 across the screen 42 to the desired focal point. This provides a more intuitive interface for designating the focal point. Furthermore, a tablet with a touch-sensitive screen can be easily used by both right- and left-handed operators, thereby eliminating any ergonomic issues associated with a focus wheel or other mechanical focus control.

Trigger Switch

Figure 3:
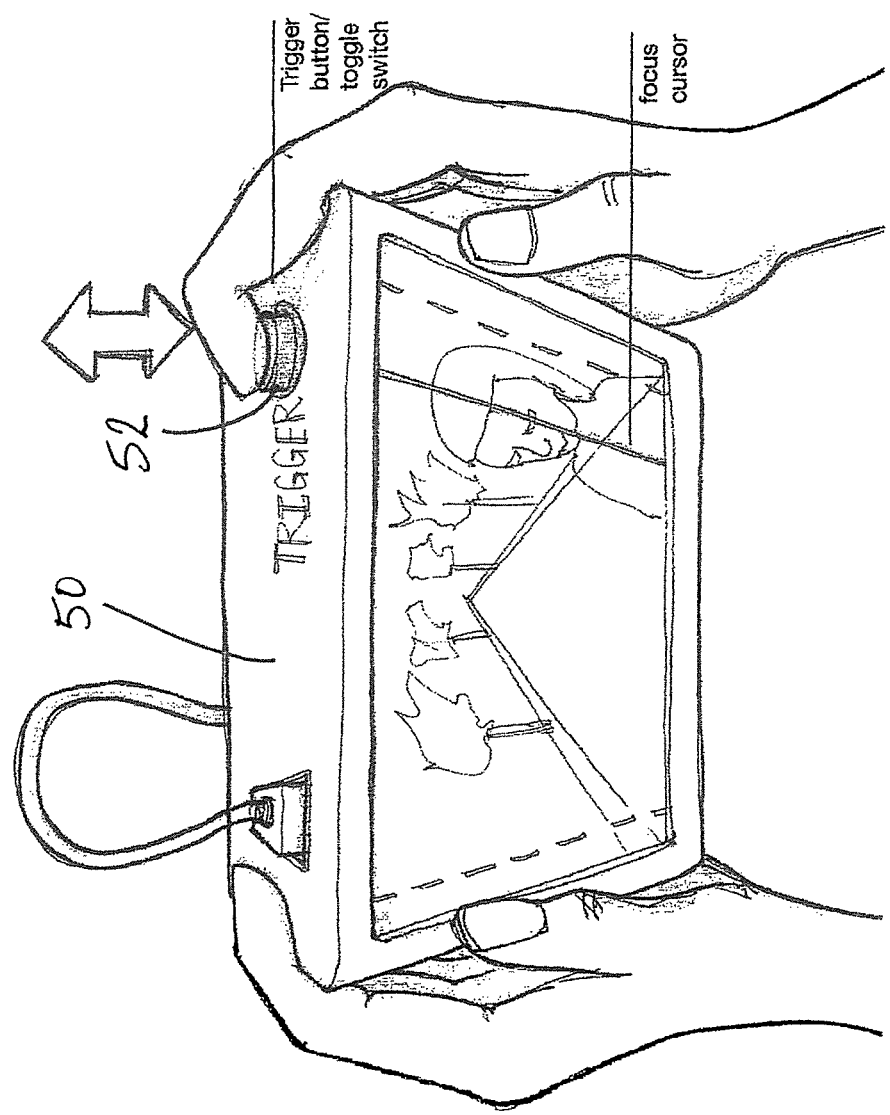
FIG. 3 illustrates a focus tablet having a trigger switch.

If the focus cursor position information is continuously sent to the main processor, any accidental bump or movement of the focus cursor will result in an unintended change in the focus of the main camera. To prevent this, a button or switch 52 may be provided on focus tablet 50 as shown in FIG. 3. This switch allows the operator to tell the system whether or not to consider the current position of the cursor when solving the triangulation equation. Such a switch allows the operator to accidentally or deliberately move the focus cursor without affecting the main camera focus.

The trigger switch may be implemented as a toggle switch allowing the operator to select either fully enabling or disabling the use of the cursor position information. Alternatively, the trigger switch may be implemented as a momentary action button. The button may either be normally on, in which case the button would be pressed to stop sending cursor position information and then released to resume, or normally off, in which case the button would be pressed to begin sending cursor position information and then released to stop.

Local Zooming

Figure 4:
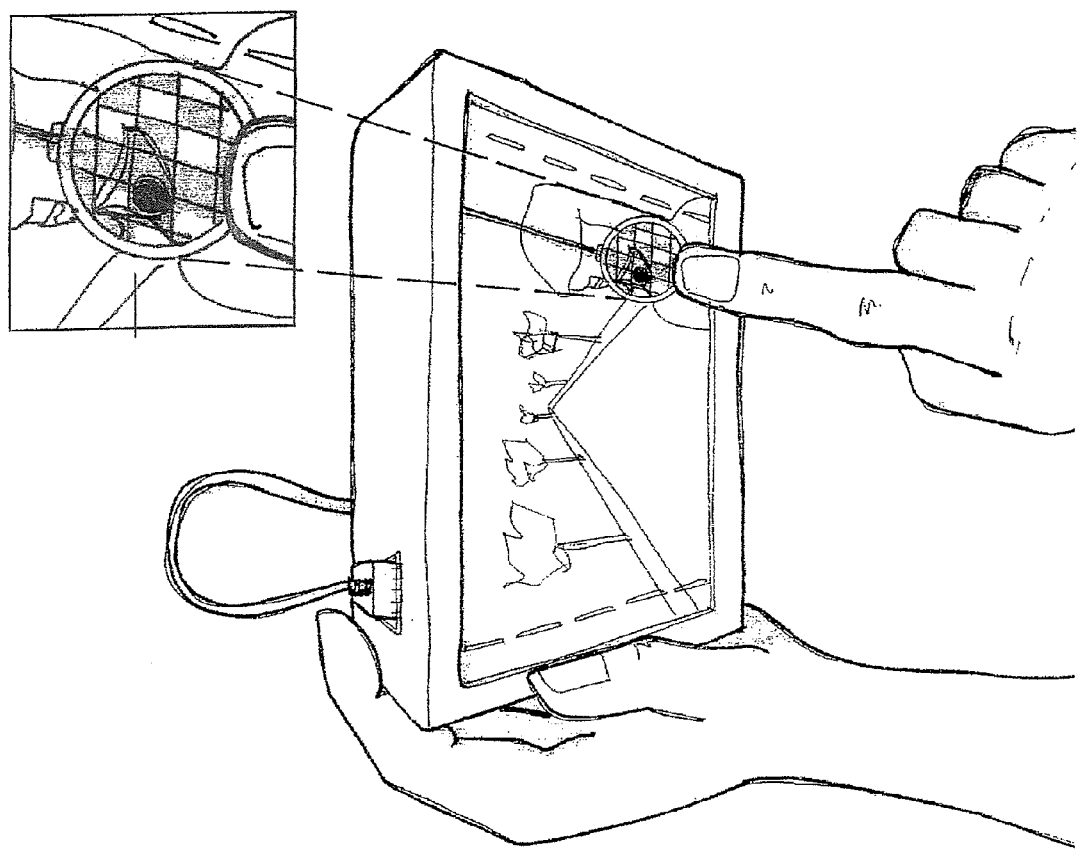
FIG. 4 illustrates local zooming of the focusing image.

The operator's ability to accurately position the focus cursor is dependent on the resolution of the tablet display. Even though the focusing camera may have a fixed focal length, the image from the focusing camera may be digitally zoomed on the tablet display. Software may be provided to allow the operator to zoom-in on a selected region of the video image from the focusing camera and then fine-tune the cursor position within the zoomed-in region as shown in FIG. 4. This effect may be implemented in a manner similar to the magnification tool used in a variety of smart phones, tablets and computers. The focusing precision of the tablet operator may thus be increased by artificially enhancing the resolution of the image on the tablet display.

Image Layering

The system described in U.S. Pat. No. 8,121,471 employs two (left and right) focusing cameras. The video images from these cameras may be displayed on separate monitors, in which case two focusing operators are needed—one for each of the focusing cameras. The operators move a cursor over a static video image to designate the same object (the focal point) in each of the images. The cursor positions are then used to determine the distance to the focal point by triangulation.

Figure 5:
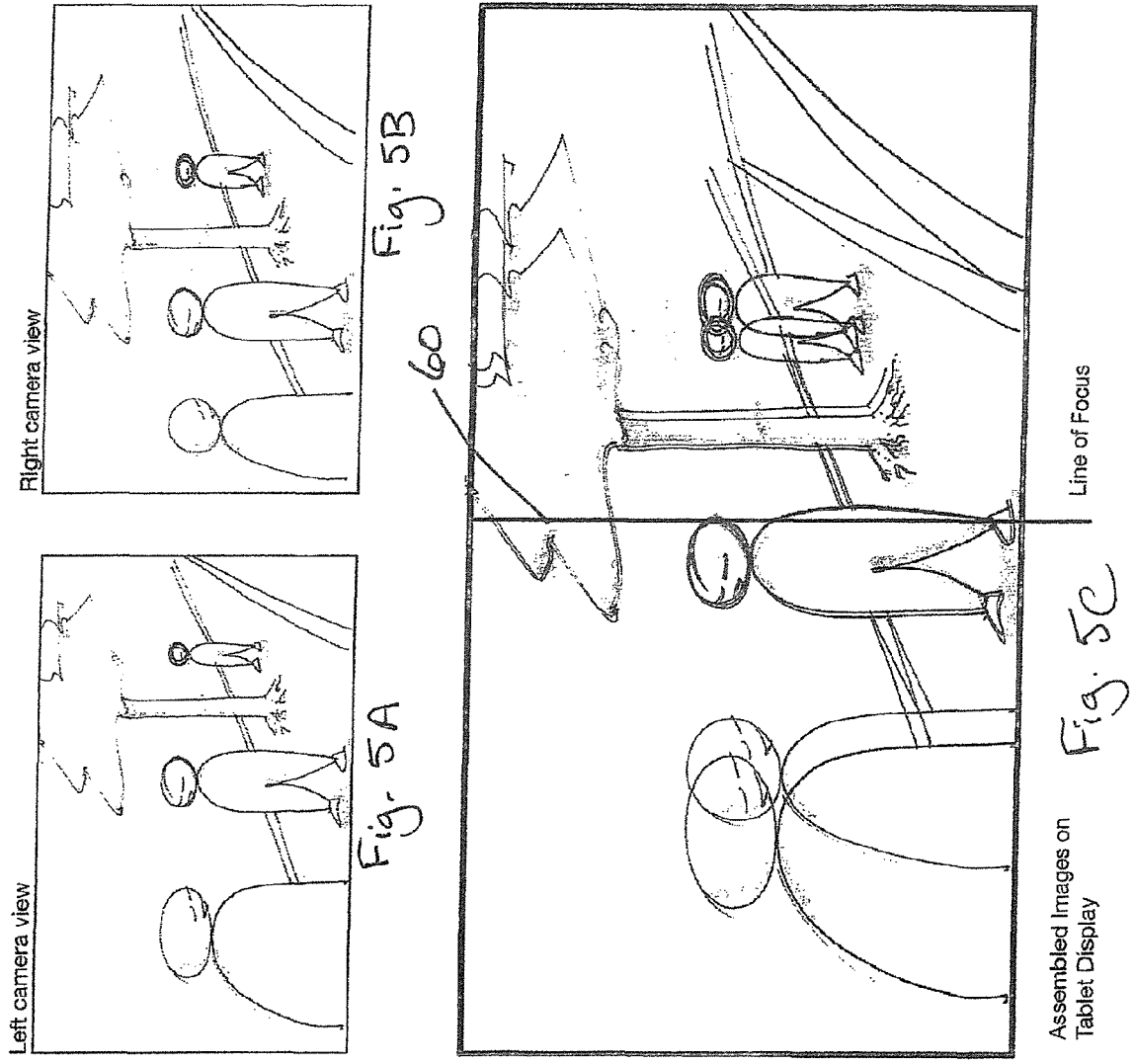
FIGS. 5A-5C illustrate image layering on the focusing screen.

A different approach is illustrated in FIGS. 5A-5C. Here, the cursor 60 is static and the images from the focusing cameras are movable on the tablet screen. The images from the left and right focusing cameras may be layered onto the same screen. By layering the two views, a focal point on a target object is designated by sliding the two views relative to the fixed cursor or reticle, which may be conveniently the centerline of the screen, so that the selected focal point in each image is aligned with the cursor. The amount that each image is displaced feeds into the triangulation equation to compute the distance to the focal point. This approach allows a single operator with a single tablet to control the focal distance.

In a variation on this approach, the layered images may be processed to provide an artificial 3D effect. The operator can wear a pair of polarized glasses such that the two images appear to float one above the other. This allows the operator to more readily visually distinguish the two images and decreases the visual confusion that might otherwise occur from having the images layered.

Eye Tracking

There are known systems for tracking the movement of a person's eyeballs and determining the direction of the person's line of sight. Such a system may be adapted to assist with camera focusing. The focus operator wears a set of glasses that track the operator's eye movements. Rather than using a tablet or other video monitor, the operator simply looks at the focal point object. By determining the position of the operator's left and right eyes, the angles between the plane of the operator's face and the line of sight of each eye can be determined. By knowing the distance between the operator's pupils and the angle from each eye to the selected object, the distance from the operator to the selected object may be triangulated.

Image Stabilization

In most situations, an object selected as the focal point will move within the scene at a rate that can be easily tracked by the focus operator(s). However, in a situation where the camera rig is moving erratically or is shaking, it is difficult for the focus operator(s) to accurately track the target object even if the object itself is not moving to another focal plane. The apparent movement of the object on the focusing screen can be significantly greater and more unpredictable than the actual movement of the object within the scene.

Figure 6:
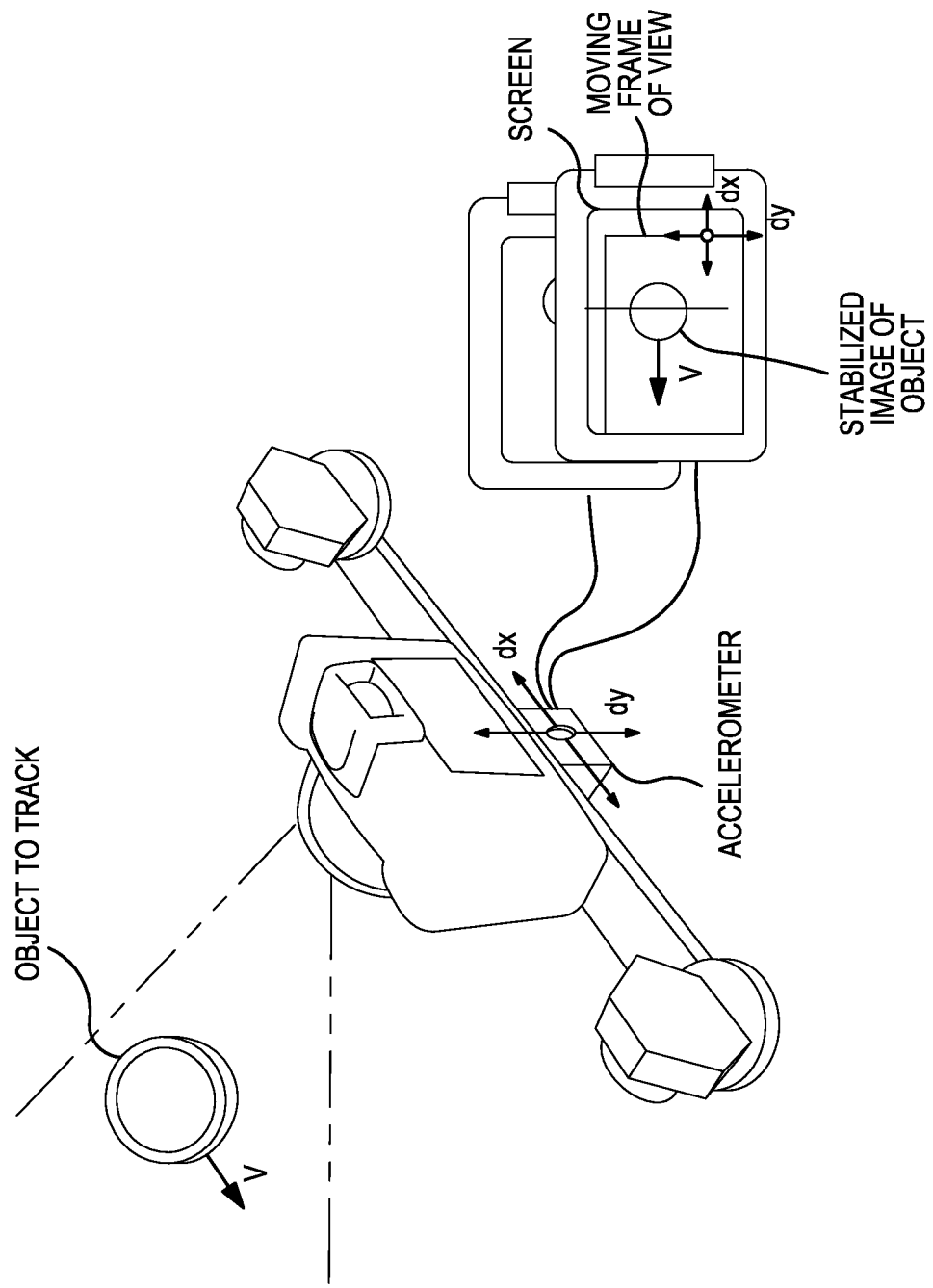
FIG. 6 illustrates inertial stabilization of the focusing image.

To minimize the relative movement of objects in the focusing image and to more accurately display their actual movement within the scene, the image on the focusing screen may be digitally stabilized as illustrated in FIG. 6. An accelerometer mounted on the camera rig measures the erratic movements of the rig. The view frame displayed on the focusing view screen is digitally compensated for such movements so that the target object remains stable, except for any actual movement of the target object within the scene.

Angular Adjustment of Focusing Cameras

Figure 7:
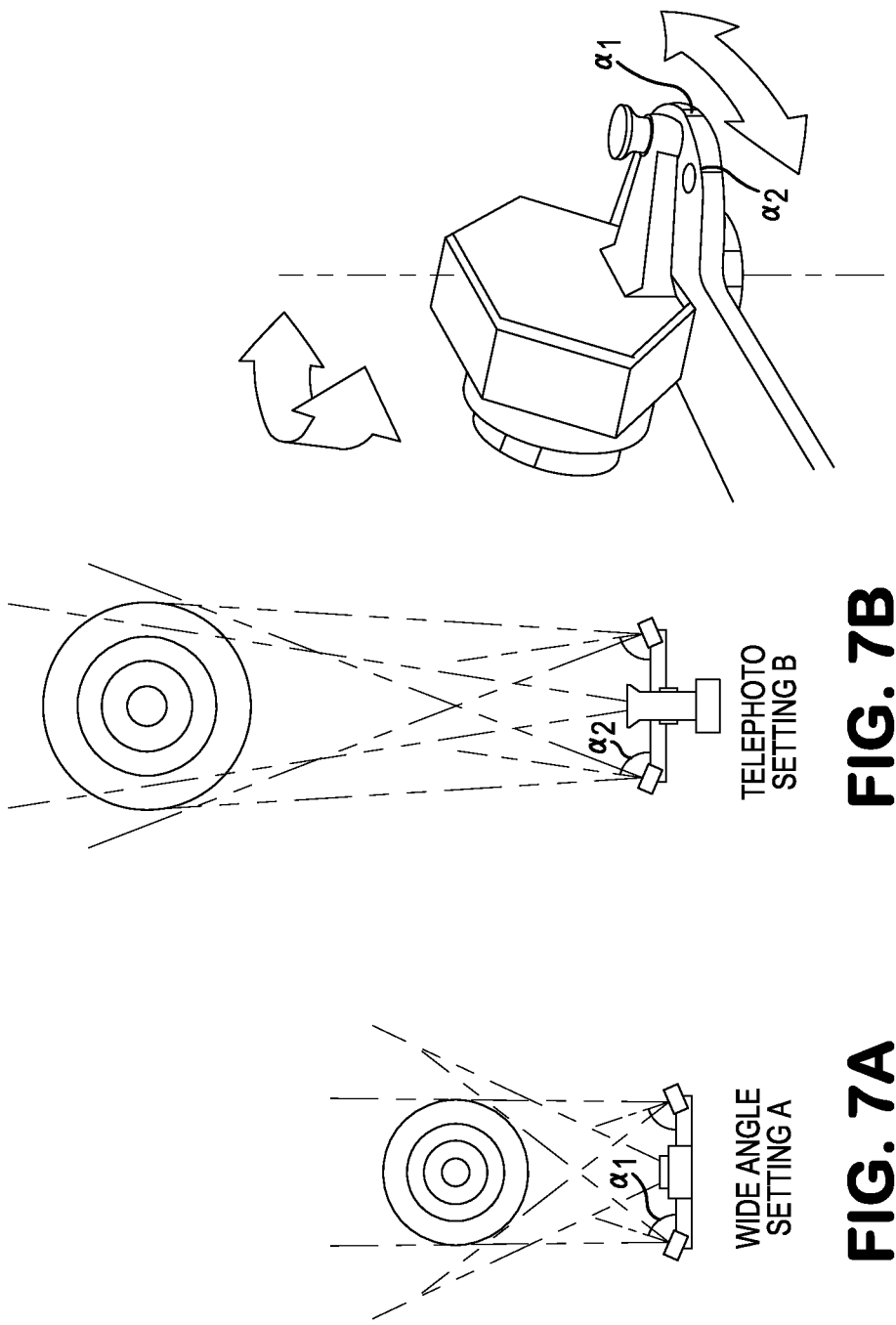
FIGS. 7A-7C illustrate angular adjustment of the focusing cameras.

It may be advantageous to use a variety of main camera lenses to shoot objects that are near or far from the main camera; for example, a wide angle lens for a nearby object and a telephoto lens for a distant object. Changing the main camera lens does not necessarily require changing the lenses on the focusing cameras since cameras with sufficient image resolution can provide accurate focusing angles through a large range of distances. However, it is desirable to have the focal point object near the center of the focusing camera image frame. This can be accomplished by adjusting the angular position of the focusing cameras so that their optical axes are more closely directed toward the focal point object. Thus, for nearby objects, the focusing cameras may be pointed more inwardly as shown in FIG. 7A, whereas, for more distant objects, the optical axes of the focusing cameras may be more closely aligned with the optical axis of the main camera as shown in FIG. 7B.

Since the angles of the optical axes of the focusing cameras relative to the optical axis of the main camera must be known with a high degree of accuracy, the focusing cameras should be mounted in a way so that they can be accurately and securely positioned. This can be accomplished, for example, with mountings having a series of precisely machined detents at predetermined angles.

Horizontal Adjustment of Focusing Cameras

Just as it is important to accurately know the angles of the focusing cameras relative to the main camera, it is also important to accurately know the distance from the main camera to each of the focusing cameras. The focusing cameras may be secured to the camera rig at a fixed distance from the main camera. However, there may be situations where it would be desirable to change the spacing of the focusing cameras, either to improve focusing accuracy at farther distances when using telephoto lenses (which may be accomplished by increasing the distance that the focusing cameras are spaced apart from the main camera) or for collapsing and stowing the system.

Figure 8:
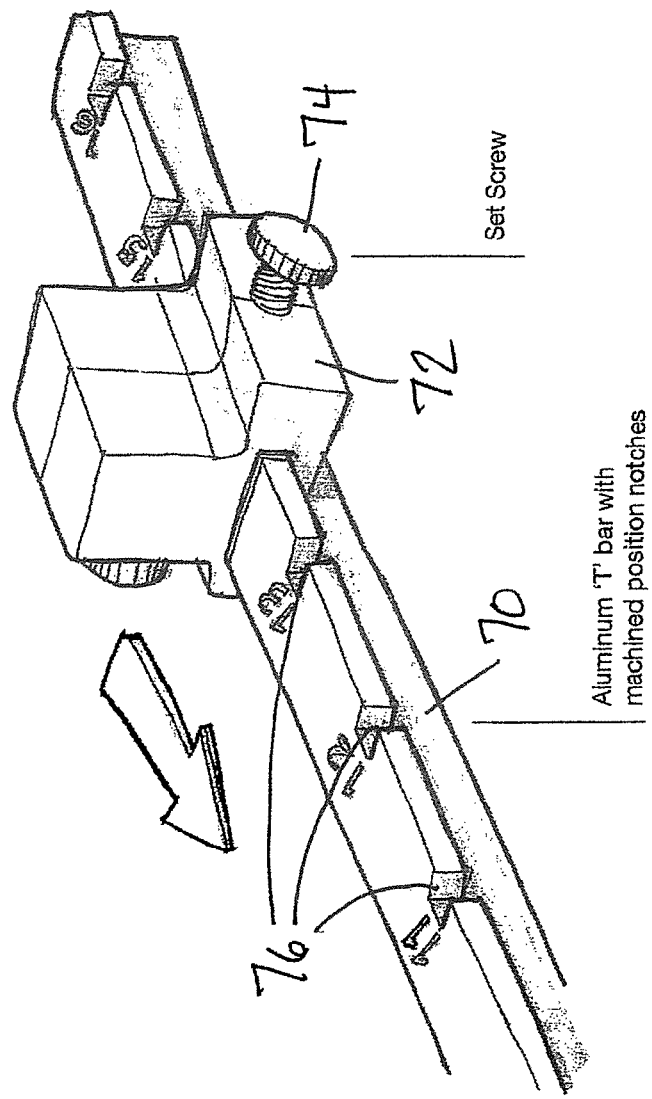
FIG. 8 illustrates horizontal adjustment of a focusing camera.

One solution for accurately positioning the focusing cameras is illustrated in FIG. 8. The camera rig includes a precision-machined aluminum T-bar 70 for each of the focusing cameras. The focusing camera mount 72 slides on the T-bar and is secured at a desired location with set-screw 74. A series of notches 76 machined into the T-bar accepts the set screw at predetermined locations.

Focusing Camera Resolution

The focusing cameras may have standard VGA resolution, which provides 640×480 pixels on the focusing screen. Higher resolution cameras may be used to capture the focusing images, thereby providing a higher resolution video output to the focus tablets or other video displays.

Pivoting Mounting Arms

Figure 9:
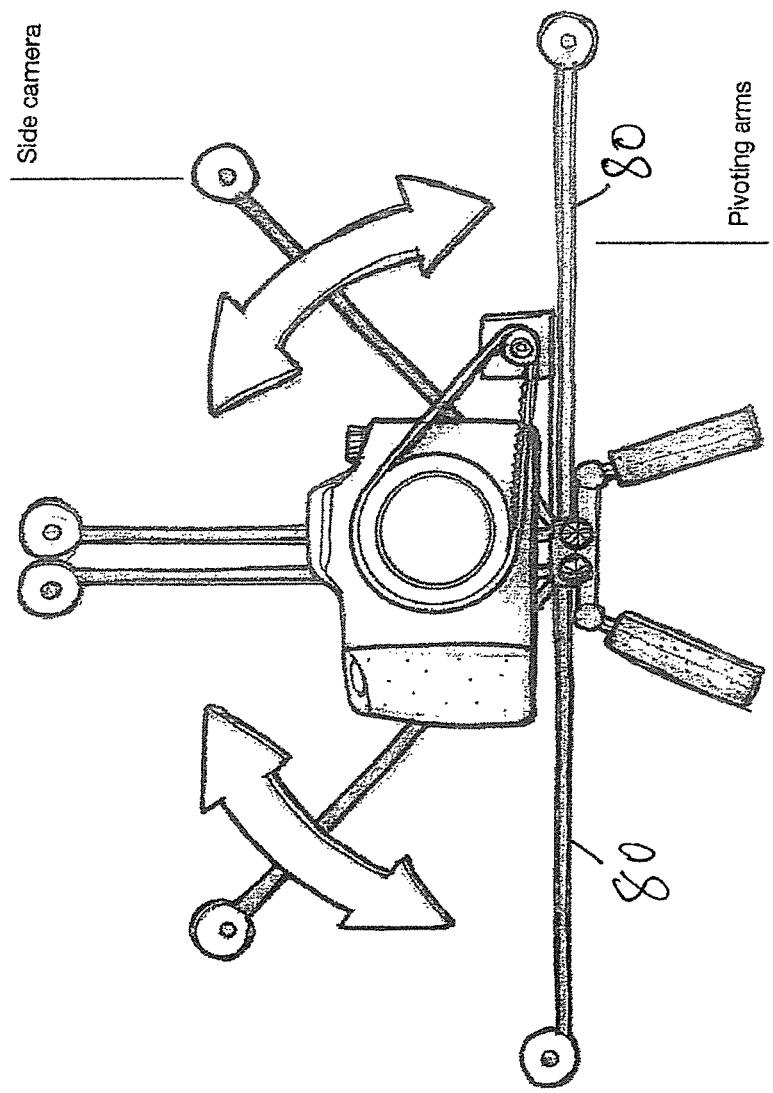
FIG. 9 illustrates a system with focusing cameras mounted on pivoting arms.

The focusing cameras may be mounted on either side of the main camera on fixed horizontal rails. Having the focusing cameras fixed in this manner may result in the view of one or both cameras being blocked in certain shots, such as over-the-shoulder shots or other shots with objects in the foreground. To alleviate this problem, the focusing cameras may be mounted on arms 80 that pivot in a vertical plane relative to the main camera as illustrated in FIG. 9. The side arms have a center of rotation on the rig beneath the main camera lens allowing one or both of the focusing cameras to be raised above any foreground object obscuring the view of the focal point object. The geometric coordinates of the raised focusing camera are fed to the system processor to maintain accuracy of the calculated focal distance for the main camera.

Apart from allowing the focusing cameras to be moved above actors or other objects obscuring the cameras' views, mounting the cameras on pivoting arms also provides an easy way to collapse the camera rig for stowing or transport and provides a convenient way to vary the spacing of the focusing cameras for use with different main camera lenses, particularly telephoto lenses.

Selectable Focus Mode

A popular follow-focus system is the FI+Z system by Preston Cinema Systems. In this system, as in other traditional follow-focus devices, the image from the main camera is fed into a high-resolution display. An operator turns a follow-focus knob until the image on the display is visually determined to be in focus. To provide compatibility with such traditional follow-focus systems, which may be a matter of operator preference, the system described in U.S. Pat. No. 8,121,471 may be configured so that the image from the main camera is displayed on one of the focus tablets. The operator control, rather than controlling a cursor position, may be used to drive the main camera focus directly, allowing the operator to visually determine that the target object is in focus, just as in a traditional follow-focus system. In such a single-operator follow-focus mode, the focusing cameras are not used.

The various embodiments described above have been illustrated in the context of a focusing system for a motion picture camera. However, it should be understood that these embodiments are all directed to systems and methods for accurately determining the distance between two objects (e.g., a camera lens and a subject to be photographed) and therefore also have applicability in other distance measurement contexts. By way of example, such other contexts may include, without limitation, surveying and sniper spotting.

The invention claimed is:

1. A photographic system comprising:
a principal camera having a focus adjustment;
first and second video cameras mounted in spaced apart positions relative to the principal camera;
a video monitor displaying a first video image from the first video camera and a second video image from the second video camera superimposed thereon;
first and second controllers for positioning the first and second video images, respectively, on the video monitor;
a processor receiving first and second position signals corresponding to positions of the first and second video images, respectively, when the first and second video images of an object are aligned, and providing a focus control signal in response thereto representing a focal distance from the principal camera to the object, said focus control signal controlling the focus adjustment of the principal camera.

2. The system of claim 1 wherein the video monitor comprises a touchscreen tablet.

3. The system of claim 1 wherein the video monitor has a fixed cursor.

4. The system of claim 3 wherein the fixed cursor is along a centerline of the video monitor.

5. The system of claim 1 wherein the processor processes the first and second video images to provide an apparent three-dimensional display.

6. The system of claim 5 wherein the first and second video images are displayed on the video monitor with differing polarizations.

7. The system of claim 1 further comprising a manual switch and wherein the focus control signal is provided in response to actuation of the manual switch.

8. The system of claim 1 wherein the video monitor includes a zoom control for enlarging a portion of the superimposed first and second video images.

9. The system of claim 1 further comprising an accelerometer coupled to the first and second video cameras and wherein the first and second video images are stabilized to compensate for movements of the first and second video cameras.

* * * * *